Dec. 14, 1965  E. F. BRILL  3,223,860
HEAT EXCHANGE SYSTEM
Filed Feb. 16, 1962

Inventor
Edward F. Brill
By Thomas F. Kirby
Attorney

3,223,860
HEAT EXCHANGE SYSTEM
Edward F. Brill, Brookfield, Wis., assignor to Allis-Chalmers Manufacturing Company, Milwaukee, Wis.
Filed Feb. 16, 1962, Ser. No. 173,692
8 Claims. (Cl. 310—11)

This invention relates generally to high temperature heat exchange systems using liquid slag as a heat exchange medium.

More particularly it relates to heat exchange systems of the type wherein heat from extremely hot combustion gas is recovered by means of liquid slag and is transferred to combustion air which is supplied to a furnace which initially provides the hot combustion gas.

A heat exchange system incorporating the present invention is particularly well suited for use in an MHD (magnetohydrodynamic) electrical power generating plant because of the extremely high temperatures encountered therein and because of the need for good thermal efficiency but is not necessarily limited to such application.

In an MHD electrical power generator, electrical power is generated by forcing an electrically conductive fluid, such as an ionized gas, through a magnetic field in the flow channel of the generator. A large commercial type of MHD generator must be continually supplied with a large volume of ionized gas at very high velocity. For economic reasons, the gas employed is usually combustion gas which is produced when fuel, such as pulverized coal, and air are burned together in a combustion chamber, such as a cyclone furnace, which is connected to the flow channel of the MHD generator. This combustion gas must be produced at a temperature of about 5000° F. to render it ionized and, therefore, electrically conductive. To produce combustion gas in the quantity and at the temperature required, the furnace must be continually supplied with a tremendous volume of combustion air which is preheated to about 3600° F. or above. It is economical and thermally efficient to preheat the combustion air with heat which is recovered from the hot gas which is exhausted from the MHD generator at a temperature of about 4000° F. The thermal efficiency of an MHD electrical power generating plant can be improved substantially by decreasing the temperature differential between the gas exhausted from the MHD generator and the preheated combustion air supplied to the furnace, i.e., by extracting as much heat as possible from the exhaust gas and using it to further preheat the combustion air. Because of the extremely high temperatures involved it is desirable to use hot liquid slag as the heat exchange medium rather than water or other conventional heat exchange media which tend to vaporize at the temperatures involved. The use of liquid slag is economical because it is obtained by recovering hot ash from the combustion gas downstream of the generator and initially adding heat recovered from the plant to it to raise it to about 800° F. so that it liquifies. The use of liquid slag is also advantageous because it has high heat enthalpy and because, being liquid, it is conveniently handled for circulation to various parts of the heat exchange system.

In an MHD electrical power generating plant utilizing a heat exchange system incorporating the present invention, highly efficient heat exchange between the hot combustion gas exhausted by an MHD electrical generator and the combustion air for a furnace occurs in the following manner. Fuel, such as pulverized coal, and air are burned together in a combustion chamber such as a cyclone furnace to provide a supply of hot combustion gas for the MHD generator. Hot combustion gas exhausted from the MHD generator is directed into a gas diffuser wherein its velocity is decerased substantially and wherein some of its kinetic energy is converted into pressure thereby raising its temperature several hundred degrees. From the gas diffuser, the hot combustion gas is directed into a first heat exchanger called a gas slag heater through which it rises vertically. Hot liquid slag is introduced at the top of the gas slag heater and is sprayed downwardly through the rising stream of gas in the gas slag heater. In the process, the hot liquid slag absorbs additional heat from the hot combustion gas and collects in a pool at the bottom of the gas slag heater. The hot liquid slag is then transferred, either by gravity or by a pump, through a graphite lined pipe to another heat exchanger called a slag air heater. The hot liquid slag is introduced near the top of the slag air heater and falls in a spray to the bottom. Compressed air, which is preheated as hereinafter explained, serves as combustion air for the furnace which is directed into the slag air heater near the bottom thereof and rises vertically therethrough on its way to the furnace. In the process, the combustion air absorbs additional heat from the hot liquid slag spray. The hot combustion air is then supplied to the furnace. In accordance with the present invention, the thermal relationship between the hot combustion air in the slag air heater and the hot liquid slag therein must be such that the liquid slag does not solidify in the course of the heat exchange but collects in a pool at the bottom of the slag air heater. Most of the hot liquid slag is then pumped through an insulated graphite lined pipe, back up to the gas slag heater for recirculation through the system. The proper heat relationship is maintained in the slag air heater by having the liquid slag and the combustion air enter it at relatively high temperatures. Accordingly, the combustion air is preheated prior to its entry into the slag air heater by first passing it through a heat exchanger called a slag cooler which uses a portion of the hot sliquid slag from the slag air heater and then passing the air through another heat exchanger called an air preheater which is located downstream of the gas slag heater and uses hot combustion gas exhausted therefrom.

It is an object of the present invention to provide an improved slag type heat exchange system which is extremely efficient from a thermal and mechanical standpoint.

Another object is to provide an improved slag type heat exchanger system wherein the slag, which has a fluid or a solid character depending on its temperature, is used to recover heat from one point in a thermal system and to transfer such heat to another point in the thermal system and wherein the slag retains its fluid character at all times so that it may be conveniently handled for circulation and recirculation.

Another object is to provide an improved heat exchange system wherein liquid slag is used to recover heat from hot exhaust gas produced by a furnace and to transfer such heat to combustion air for the furnace, wherein the liquid slag and the combustion air are both hot enough when the heat transfer between them occurs so as to prevent solidification of the slag, and wherein the liquid slag is then transferred by pumping for recirculation.

Another object is to provide a heat exchange system of the aforesaid character wherein improved means are employed to effect preheating of the combustion air prior to its contact with the liquid slag so as to prevent solidification of the latter.

Another object is to provide a system which includes a gas slag heater, a slag air preheater and additional preheating means for preheating the combustion air being supplied to the slag air heater so that the combustion air does not effect resolidification of the slag in the slag air preheater but allows it to remain in the liquid state for recirculation back to the gas slag heater.

Another object is to provide a system of the aforesaid character wherein the additional air preheater means comprises conventional heat exchanger means and slag air heater means.

Another object is to provide a system of the aforesaid character wherein the slag is conveyed from the slag air heater back to the gas slag heater in liquid form by pumping means.

Other objects and advantages of the invention will hereinafter appear.

The accompanying drawings illustrate a preferred embodiment of the invention which will hereinafter be described in detail but it to be understood that the embodiment illustrated is susceptible of modifications with respect to details thereof without departing from the scope of the appended claims.

Figures 1, 2, 3:
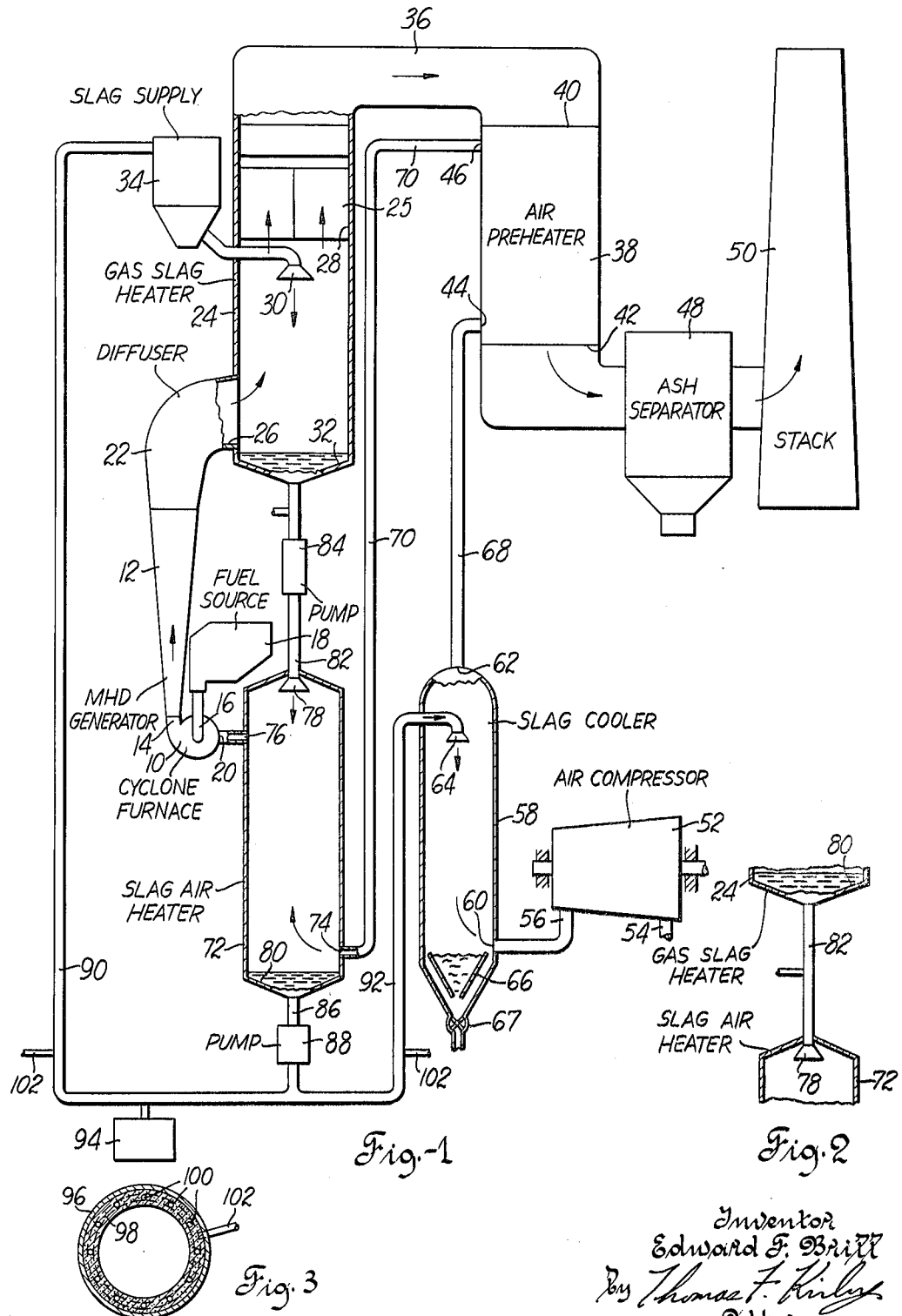
FIG. 1 is a schematic showing of a portion of an MHD electrical power generating plant having a heat exchange system incorporating the present invention.
FIG. 2 is a view of portion of the system shown in FIG. 1 showing a modification thereof.
FIG. 3 is a cross sectional view of the hot slag pipe shown in FIG. 1 showing the means for effecting heating thereof.

FIG. 1 is a schematic showing of a portion of an MHD electrical power generating plant employing a heat exchange system incorporating the present invention. The plant comprises means, such as a combustion chamber or cyclone furnace 10, for providing a large continuous supply of hot ionized combustion gas for use in apparatus such as an MHD electrical power generator 12. Cyclone furnace 10 is provided with a combustion gas outlet 14 which is connected to the input end of the flow channel in MHD generator 12 and which supplies combustion gas thereto at a temperature of about 5000° F. Cyclone furnace 10 is further provided with a fuel inlet 16 which is connected to a fuel source 18. Preferably, the fuel employed is pulverized coal since such fuel is readily available and is economical to use in large quantities. Furthermore, the fly ash from the pulverized coal provides a supply of liquid slag which is used as the heat exchange medium in the heat exchange system. Cyclone furnace 10 is also provided with a combustion air inlet 20 which is adapted to be supplied with a large continuous supply of combustion air which is preheated to about 3800° F., as will hereinafter be described.

MHD generator 12 is adapted to produce electrical power when the hot electrically conductive gas from cyclone furnace 10 is forced through the flow channel thereof at high velocity. It is to be understood that MHD generator 12 is capable of producing about 250,000 kilowatts of electrical power and that it is about 60 feet in length. Preferably, therefore, MHD generator 12 is vertically disposed in the power plant in order to conserve space and to afford other advantages. The combustion gas is exhausted from the outlet or exhaust end of the flow channel of MHD generator 12 at a temperature of about 3900° F.

The exhaust end of the flow channel of MHD generator 12 is connected to the inlet end of a gas diffuser 22. Combustion gas exhausted from MHD generator 12 entering and passing through gas diffuser 22 undergoes a substantial reduction in velocity and part of its kinetic energy is converted to heat. Therefore, the combustion gas is exhausted from gas diffuser 22 at a temperature of about 4100° F.

The exhaust end of gas diffuser 22 is connected to heat exchange means such as a gas slag heater 24. Gas slag heater 24 is in the form of a vessel having a combustion gas inlet port 26 near its bottom, a combustion gas outlet port 28 near its top, a liquid slag spray head 30 near its top, and a liquid slag reservoir 32 at its bottom. Gas slag heater 24 also includes a steam generator portion 25, shown in FIG. 1, which is adopted to serve as a superheater and reheater for steam which is understood to be required to drive various auxiliary devices employed in a plant of the type described. Combustion gas inlet port 26 of gas slag heater 24 is connected to the exhaust end of gas diffuser 22 and combustion gas enters at a temperature of about 4100° F. Liquid slag spray head 30 of gas slag heater 24 is connected to a source 34 of liquid slag and liquid slag enters at a temperature of about 2300° F. Source 34 is initially charged with a supply of liquid slag heated to about 2300° F. Gas slag heater 24 is adapted to effect the transfer of heat from the hot combustion gas entering gas inlet port 26 to the hot liquid slag entering from liquid slag spray head 30. In operation, liquid slag is sprayed or falls vertically through the vertically rising combustion gas in gas slag heater 24. During this process the liquid slag is heated to about 4000° F. and collects as a liquid in reservoir 32 in gas slag heater 24. Simultaneously, the combustion gas is cooled to about 2400° F. and is exhausted through combustion gas outlet port 28 of gas slag heater 24. After passing through steam generator portion 25 of gas slag heater 24, the combustion gas is further cooled to about 1400° F.

It is to be understood that the combustion gas in gas slag heater 24 contains fly ash in the form of liquid and vaporized slag and a portion of it condenses or collects into droplets which fall into reservoir 32 of gas slag heater 24. In this manner, the amount of heat exchange medium in the system is replenished to offset that which is removed from the system, as hereinafter explained, and otherwise lost from the system.

Combustion gas outlet port 28 of gas slag heater 24 is connected through a conduit 36 to heat exchange means such as an air preheater 38. Air preheater 38 is understood to have a combustion gas side and a combustion air side and is provided with a combustion gas inlet port 40, a combustion gas outlet port 42, a combustion air inlet port 44, and a combustion air outlet port 46. Combustion gas inlet port 40 of air preheater 38 is connected to conduit 36 and combustion gas enters at a temperature of about 1400° F. Air preheater 38 is adapted to effect the transfer of heat from the hot combustion gas passing through the combustion gas side thereof to the combustion air passing through the combustion air side thereof.

Combustion gas outlet port 42 of air preheater 38 is connected to an ash separator 48 wherein hot fly ash is separated from the hot combustion gas passing therethrough. It is to be understood that a portion of the hot fly ash recovered from ash separator 48 is supplied to cyclone furnace 10 to serve as a seeding medium to enhance the electrical conductivity of the combustion gas. Ash separator 48 is connected to an exhaust stack 50 and hot combustion gas from the ash separator is expelled to the atmosphere therethrough.

FIG. 1 further shows that the plant comprises means for providing a supply of preheated combustion air of cyclone furnace 10. Such means comprise an air compressor 52 having an air inlet 54 and a combustion air outlet 56. Air compressor 52 receives air from the atmosphere through air inlet 54, compresses it and raises its temperature to about 215° F.

Combustion air outlet 56 of air compressor 52 is connected to heat exchange means such as a slag cooler 58. Slag cooler 58 is in the form of a vessel having a combustion air inlet port 60 near its bottom, a combustion air outlet port 62 near its top, a liquid slag spray head 64 near its top, and slag pellet collecting means 66 at its bottom. Combustion air inlet port 60 of slag cooler 58 is connected to combustion air outlet 56 of air compressor 52 and combustion air enters the slag cooler at a temperature of about 215° F. Liquid slag spray head 64, which is connected as hereinafter described, introduces liquid slag into slag cooler 58 at a temperature of about 2300° F. Slag cooler 58 is adapted to effect the transfer of heat from the hot liquid slag entering from slag spray head 64 to the combustion air entering air inlet port 60. In operation, liquid slag is sprayed or falls vertically through the vertically rising combustion air in slag cooler 58. During this process the liquid slag is cooled to about 300° F. and collects in the form of pellets in pellt collecting means 66 in slag cooler 58. Simultaneously, the combustion air from air compressor 52 is further heated and passes out through combustion air outlet port 62 of slag cooler 58. The slag pellets are removed from pellet collecting means 66 in slag cooler 58 through an air lock 67 which is provided at the bottom of the slag cooler and are disposed of as low alkali content slag.

Combustion air outlet port 62 of slag cooler 58 is connected by a pipe 68 to combustion air inlet port 44 of air preheater 38. The combustion air passing through the combustion air side of air preheater 38 is heated to about 1200° F. Combustion air outlet port 46 of air preheater 38 is connected by a pipe 70 to heat exchange means such as a slag air heater 72.

Slag air heater 72 is in the form of a vessel having a combustion air inlet 74 near its bottom, a combustion air outlet port 76 near its top, a liquid slag spray head 78 near its top, and a liquid slag reservoir 80 at its bottom. Combustion air inlet 74 of slag air heater 72 is connected to pipe 70 and combustion air enters the slag air heater at a temperature of about 1200° F. Liquid slag spray head 78 of slag air heater 72 is connected by a pipe or conduit 82 to liquid slag reservoir 32 of gas slag heater 24 and liquid slag enters slag air heater 72 at a temperature of about 4000° F. Slag air heater 72 is adapted to effect the transfer of heat from the liquid slag entering from slag spray head 78 to the combustion air entering combustion air inlet 74. In operation, liquid slag is sprayed or falls vertically through the vertically rising combustion air in slag air heater 72. During this process the liquid slag is cooled to about 2300° F. and collects as a liquid in reservoir 80 in slag air heater 72. Simultaneously, the combustion air is heated to about 3800° F. and is supplied through combustion air outlet port 76 of slag air heater 72 to combustion air inlet 20 of cyclone furnace 10.

FIG. 1 shows that pipe or conduit 82 through which liquid slag is transferred from gas slag heater 24 to slag air heater 72 is provided with means, such as a pump 84, to facilitate the flow of the liquid slag. Pump 84 is understood to be a conventional type of pump which is adapted to withstand the extremely high temperature involved. However, in certain instances, particularly where the gas slag heater 24 is physically located above the slag air heater 72 and where they are relatively close together, it is possible to use the arrangement shown in FIG. 2 wherein no pump is employed in pipe 82 and reliance is had on gravity flow to effect transfer of the liquid slag.

Liquid slag reservoir 80 of slag air heater 72 is connected by a pipe or conduit 86 to the intake end of a pump 88 which is understood to be similar to pump 84 hereinbefore described. The output end of pump 88 is connected by a pipe or conduit 90 to the source 34 of the liquid slag and is also connected by a pipe or conduit 92 to slag spray head 64 of slag cooler 58. Pump 88 and pipe 90 are adapted to convey liquid slag to slag source 34 at a temperature of about 2300° F. for recirculation. Pipe 90 is also connected to a heated slag storage tank 94 which is adapted to accommodate all liquid slag in the system when the system is drained incidental to shutting down the plant. Tank 94 also provides the initial supply of hot liquid slag when the plant is placed in operation and the slag is transferred from the tank to slag source 34, to reservoir 80 in slag air heater 72, and slag spray head 64 in slag cooler 58. Pump 88 and pipe 92 are adapted to convey liquid slag to slag spray head 64 of slag cooler 58 at a temperature of about 2300° F. to effect heating of the combustion air therein as hereinbefore described.

It is preferred that the pipes in the system which convey liquid slag, namely, pipes 82, 90 and 92, to be constructed so as to prevent the slag from depositing on the walls therein and to prevent heat loss from the slag while it is being conveyed through the pipes. FIG. 3 shonws one preferred manner of constructing the pipes. FIG. 3 is a cross sectional view of a pipe having a steel outer casing 96 and a cylindrical graphite liner 98. Graphite liner 98 is provided with a plurality of holes 100 which are adapted to accommodate the flow of hot fluid, such as hot combustion gas, which heats the pipe and prevents cooling of the slag therein. In FIG. 3, the pipe heating fluid is shown as being supplied to the holes 100 through a pipe 102 which, it is to be understood, could be supplied from the combustion gas stream itself.

The MHD electrical power generating plant and heat exchange system shown in FIG. 1 operates in the following manner.

Assume that fuel and preheated combustion air are being supplied to cyclone furnace 10 and that the latter is producing hot combustion gas for MHD generator 12. Further, assume that the heat exchange system is charged with hot liquid slag. Combustion gas enters MHD generator 12 at high velocity and is exhausted therefrom at reduced temperature and velocity into gas diffuser 22. In gas diffuser 22 the combustion gas experiences a further reduction in velocity and an increase in temperature. Combustion gas from gas diffuser 22 enters gas slag heater 24 wherein it transfers some of its heat to liquid slag which is supplied to the gas diffuser from slag source 34. Combustion gas from gas slag heater 24 passes through conduit 36 and through the gas side of air preheater 38 wherein it transfers heat to combustion air which is understood to be passing through the combustion air side of the air preheater. Combustion gas from air preheater 38 then passes through ash separator 48 and stack 50 to the atmosphere.

Liquid slag from gas slag heater 24 is transferred through pipe 82, either by pump 84 or by gravity, to slag air heater 72 wherein it transfers heat to combustion air which is understood to be passing therethrough on its way to cyclone furnace 10. A portion of the liquid slag from slag air heater 72 is transferred by pump 88 through pipe 90 back to slag source 34 for recirculation. Another portion of the liquid slag from slag air heater 72 is transferred by pump 88 through pipe 92 to slag cooler 58 wherein it transfers heat to combustion air which is understood to be passing therethrough on its way to air preheater 38 and solidifies in the process.

Air compressor 52 extracts air from the atmosphere and, after compressing it and raising its temperature, supplies it to slag cooler 58 wherein it is further heated as hereinbefore described. From slag cooler 58 the air is delivered to the combustion air side of air preheater 38 wherein it undergoes a further increase in temperature as hereinbefore described. From air preheater 38 the air is delivered to slag air heater 72 wherein it undergoes a further increase in temperature as hereinbefore described. From slag air heater 72 the air is delivered to cyclone furnace 10.

It is apparent from the foregoing description that a heat exchanger system incorporating the present invention is adapted to extract the maximum amount of heat from the exhaust gas supplied by cyclone furnace 10 and to transfer it with a minimum of loss to the combustion air for the cyclone furnace. It is further apparent that the ability to transfer the slag from slag air heater 72 back to slag source 34 in liquid form merely by pumping affords many advantages, particularly in large power plants where the distances involved are great and cost of installation and operation are important factors.

Having now particularly described and ascertained the nature of my said invention and the manner in which it is to be performed, I declare that what I claim is:

1. In a heat exchange system, in combination, a combustion chamber for burning fuel and combustion air to provide hot exhaust gas, a source of heat exchange medium heated to a liquid state, said medium tending to solidify below a predetermined temperature, a first heat exchanger into which said exhaust gas and said medium in liquid state are directed and wherein heat is transferred from said hot exhaust gas to said medium to increase the temperature of the latter, a source of combustion air for said combustion chamber, a second heat exchanger into which said combustion air from said source and said medium in liquid state from said first heat exchanger are directed and wherein heat is transferred from said medium to said combustion air prior to the entry of the latter into said combustion chamber, said combustion air and said medium within said second heat exchanger having a temperature relationship which is such that after the heat exchange therebetween the medium remains above said predetermined temperature and in the liquid state, and means for pumping said medium in the liquid state from said second heat exchanger back to its source for recirculation.

2. In a heat exchange system, in combination, a combustion chamber for burning fuel and combustion air to provide hot combustion gas, a source of hot liquid slag, said slag tending to solidify below a predetermined temperature, a first heat exchanger into which said combustion gas is directed and into which liquid slag from said source is directed and wherein heat is transferred from said combustion gas to said liquid slag to increase the temperature of the latter, a source of preheated combustion air for said combustion chamber, a second heat exchanger into which said preheated combustion air is directed and into which liquid slag from said first heat exchanger is directed and wherein heat is transferred from said liquid slag to said preheated combustion air to further increase the temperature of the latter prior to its entry into said combustion chamber, said preheated combustion air and said hot liquid slag within said second heat exchanger having a thermal relationship which is such that the liquid slag remains above said predetermined temperature and in the liquid state after it transfers heat to the preheated combustion air, and means for pumping said liquid slag from said second heat exchanger back to its source for recirculation.

3. The combination according to claim 2 wherein said source of preheated combustion air comprises heat exchanger means downstream of said first heat exchanger into which said hot combustion gas is directed and into which said combustion air is directed prior to its entry into said second heat exchanger.

4. In a heat exchange system, in combination, a combustion chamber for burning fuel and combustion air to provide a supply of hot combustion gas, apparatus for utilizing said combustion gas and through which it is directed, a source of hot liquid slag, said slag tending to solidify below a predetermined temperature, a slag heater downstream of said apparatus through which combustion gas from said apparatus is directed and into which liquid slag from said source is directed and wherein heat is transferred from said combustion gas to said liquid slag to increase the temperature of the latter, a source of combustion air for said combustion chamber, an air preheater downstream of said slag heater through which combustion gas from said slag heater is directed and into which combustion air from said source is directed and wherein heat is transferred from said combustion gas to said combustion air to increase the temperature of the latter, an air heater into which liquid slag from said slag heater is directed and into which combustion air from said air preheater is directed and wherein heat is transferred from said liquid slag to said combustion air to further increase the temperature of the latter prior to its entry into said combustion chamber, said combustion air and said liquid slag within said air heater having a thermal relationship which is such that the slag remains above said predetermined temperature and in the liquid state after the heat exchange therebetween, and means for pumping said slag in liquid form from said air heater back to its source for recirculation.

5. In a heat exchange system, in combination, a combustion chamber for burning fuel and combustion air to provide a supply of hot combustion gas, apparatus for utilizing said combustion gas and through which it is directed, a source of hot liquid slag, said slag tending to solidify below a predetermined temperature, a slag heater downstream of said apparatus and through which combustion gas from said apparatus is directed and into which liquid slag from said source is directed and wherein heat is transferred from said combustion gas to said liquid slag to increase the temperature of the latter, an air heater into which liquid slag from said slag heater is directed, a source of combustion air for said combustion chamber, a slag cooler into which a portion of said liquid slag from said air heater is directed and into which combustion air from said source is directed and wherein heat is transferred from said liquid slag to said combustion air thereby effecting solidification of the slag in the process, an air preheater downstream of said slag heater and through which combustion gas from said slag heater is directed and into which combustion air from said slag cooler is directed and wherein heat is transferred from said combustion gas to said combustion air to increase the temperature of the latter, means for conveying said combustion air from said air preheater to said air heater to provide for heat transfer from said liquid slag in said air heater to said combustion air to increase the temperature of the latter prior to its entry into said combustion chamber, means for directing said combustion air from said air heater into said combustion chamber, means for pumping a portion of said liquid slag from said air heater to said slag cooler, and means for pumping another portion of said liquid slag from said air heater to said source of hot liquid slag for recirculation.

6. In an MHD electrical power generating plant, in combination, an MHD electrical generator, a furnace for burning fuel and combustion air to provide hot combustion gas to said generator, a source of hot liquid slag, a first heat exchanger into which combustion gas exhausted from said generator is directed and into which liquid slag from said source is directed and wherein heat is transferred from said combustion gas to said liquid slag, a source of preheated combustion air for said furnace, a second heat exchanger into which combustion air from said source is directed and into which liquid slag from said first heat exchanger is directed and wherein heat is transferred from said slag to said combustion air, and means for pumping said liquid slag from said second heat exchanger to said first heat exchanger for recirculation.

7. In an MHD electrical power generating plant, in combination, an MHD electrical generator, a furnace for burning fuel and combustion air to provide hot combustion gas to said generator, a source of liquid slag, a first heat exchanger into which combustion gas exhausted from said generator is directed upwardly and into which liquid slag from said source is directed downwardly, said first heat exchanger adapted to accommodate the upward flow of said combustion gas and the downward flow of said liquid slag whereby heat is transferred from said combustion gas to said liquid slag, a source of preheated combustion air for said furnace, a second heat exchanger into which liquid slag from said first heat exchanger is directed downwardly and into which combustion air from said source is directed upwardly, said second heat exchanger adapted to accommodate the downward flow of said liquid slag and the upward flow of said combustion air whereby heat is transferred from said slag to said combustion air, and means for pumping said liquid slag from said second to said first heat exchanger for recirculation.

8. In an MHD electrical power generating plant, in combination, a furnace for burning fuel and combustion air to provide hot combustion gas, an MDH electrical generator downstream of said furnace and through which said combustion gas passes, a source of hot liquid slag, a first heat exchanger downstream of said generator into which combustion gas from said generator is exhausted and into which liquid slag from said source is directed to extract heat from the combustion gas therein, a source of combustion air, a second heat exchanger through which said combustion air passes, a third heat exchanger downstream of said first heat exchanger into which combustion gas from said first heat exchanger is exhausted and into which combustion air from said second heat exchanger is directed to extract heat from the combustion gas therein, a fourth heat exchanger into which liquid slag from said first heat exchanger is directed and into which combustion air from said third heat exchanger is directed to extract heat from the liquid slag therein, means for directing said combustion air from said fourth heat exchanger into said furnace, means for transferring a portion of said liquid slag from said fourth heat exchanger into said second heat exchanger to effect heating of the combustion air therein, and means for pumping another portion of said liquid slag from said fourth heat exchanger back to the hot liquid slag source for recirculation.

References Cited by the Examiner
UNITED STATES PATENTS
1,681,926   8/1928   Bell.

FOREIGN PATENTS
1,114,973   10/1961   Germany.

OTHER REFERENCES
Power, November 1959, pp. 62–65.

ORIS L. RADER, *Primary Examiner.*
CHARLES SUKALO, *Examiner.*